METHOD OF PRODUCING ELECTRIC CURRENTS WITH CYCLIC WAVE FORM

Filed Jan. 28, 1949 5 Sheets-Sheet 1

INVENTOR.
Heinz Erwin Kallmann
BY
Michael S. Striker

INVENTOR.
Heinz Erwin Kallmann
BY

INVENTOR.
Henry Erwin Kallmann
BY

METHOD OF PRODUCING ELECTRIC CURRENTS WITH CYCLIC WAVE FORM

Filed Jan. 28, 1949

INVENTOR.

Heinz Erwin Kallmann

BY

Michael S. Striker

Jan. 8, 1952 H. E. KALLMANN 2,581,798

METHOD OF PRODUCING ELECTRIC CURRENTS WITH CYCLIC WAVE FORM

Filed Jan. 28, 1949 5 Sheets-Sheet 5

INVENTOR.

Heinz Erwin Kallmann

BY

Michael S. Striker

UNITED STATES PATENT OFFICE 2,581,798

METHOD OF PRODUCING ELECTRIC CURRENTS WITH CYCLIC WAVE FORM

Heinz Erwin Kallmann, New York, N. Y.

Application January 28, 1949, Serial No. 73,311

11 Claims. (Cl. 250—27)

My present invention relates to methods of producing electric currents with a cyclic wave form having a substantially straight slant for at least part of each cycle.

More particularly, my present invention relates to methods of producing saw-tooth currents.

It is an object of my present invention to produce currents of the above type accurately, yet with high efficiency.

I am particularly interested in saw-tooth currents which are widely used for scanning deflection of cathode ray tube beams. The generation of such saw-tooth currents will therefore be chosen as an example of my new method of wave-form synthesis though the same is also applicable to other waveforms.

In current practice, saw-tooth currents are generally produced from relaxation oscillations, seldom accurately and never with an appreciable efficiency. To understand my new method, it is well to remember that, like any other periodic waveform, a saw-tooth wave S may be synthesized from a series of harmonic sine waves, the equation for the case of a saw-tooth wave being $$S=\sin\omega_1+\tfrac{1}{2}\sin\omega_2+\tfrac{1}{3}\sin\omega_3+\tfrac{1}{4}\sin\omega_4+\tfrac{1}{5}\sin\omega_5+\ldots+\frac{1}{n}\sin\omega_n$$

Such a method of synthesis is, however, not practicable since for close approximation of the desired smooth saw-tooth shape the outputs of more than a dozen sinewave generators must be added, each with low distortion, of accurate amplitude and phase.

I propose instead, in accordance with my present invention, to synthesize periodic waveforms, such as saw-tooth waves, from a small number of properly synchronized periodic sequences of square pulses, particularly square waves.

The novel features which I consider as characteristic for my new processes are set forth in particular in the appended claims. My new methods themselves, however, will be best understood from the following general explanations and description of specific embodiments when read in connection with the accompanying drawings, in which:

Figure 1:
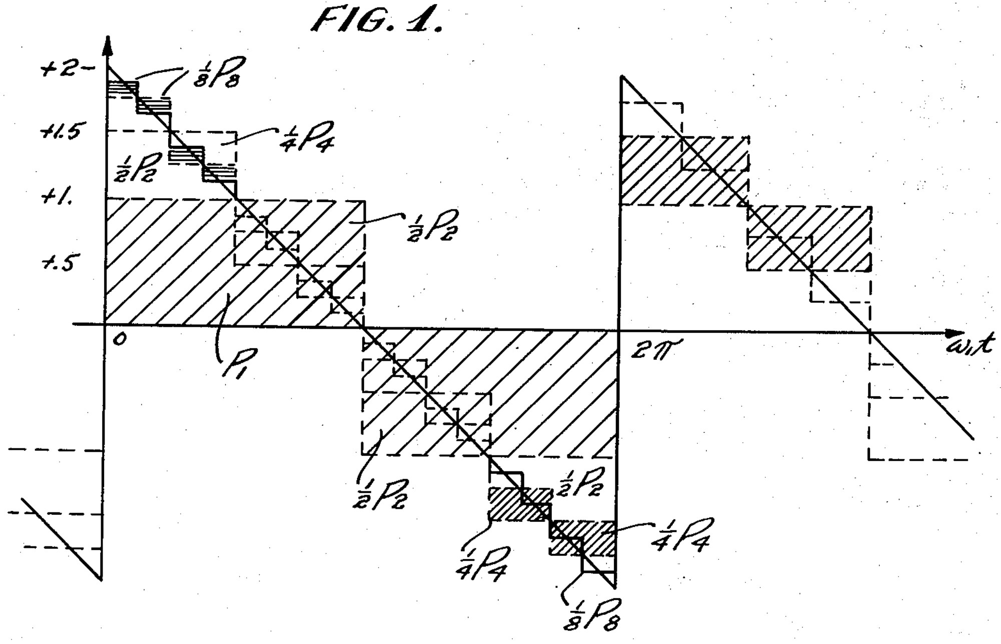
Fig. 1 is a diagrammatic showing of a synthesis of saw-tooth waves from square waves.
Figure 2:
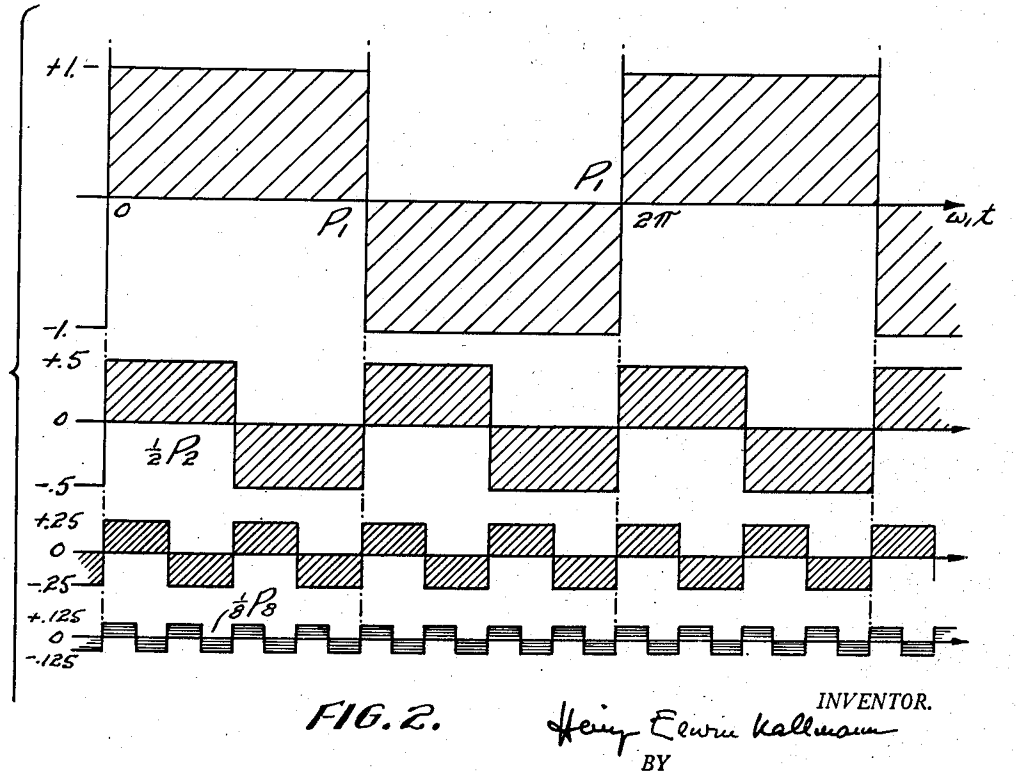
Fig. 2 is a diagrammatic explanation of the saw-tooth wave synthesis shown in Fig. 1.
Figure 3:
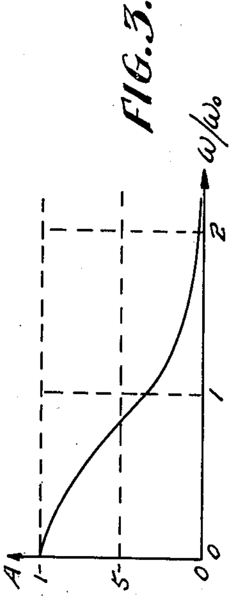
Figure 4:
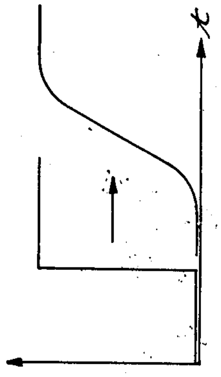
Figure 5:
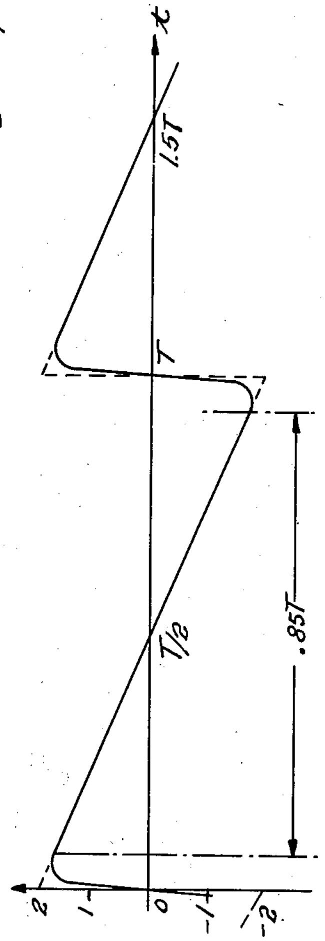
Figure 6:
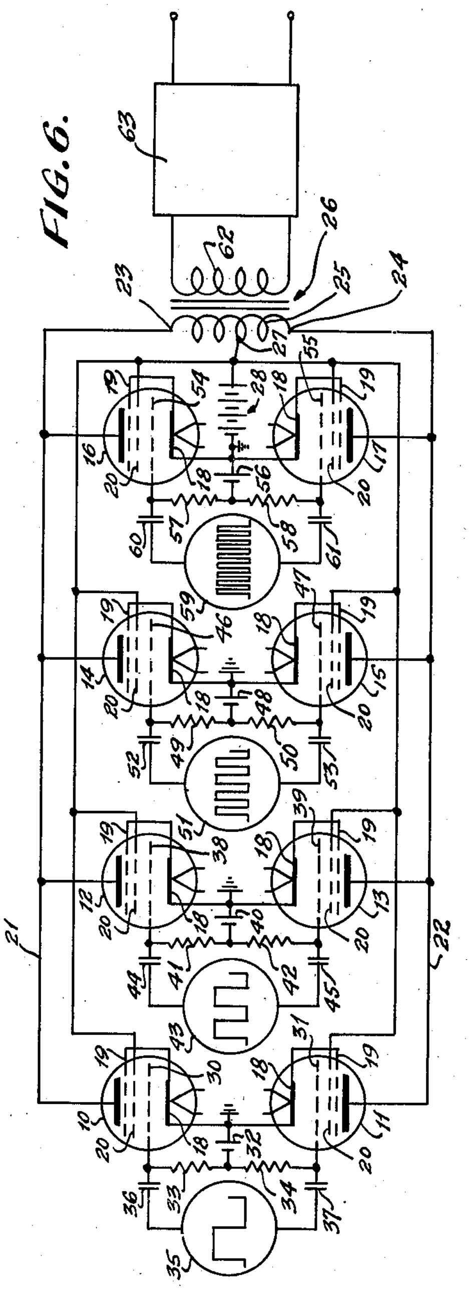
Figure 7:
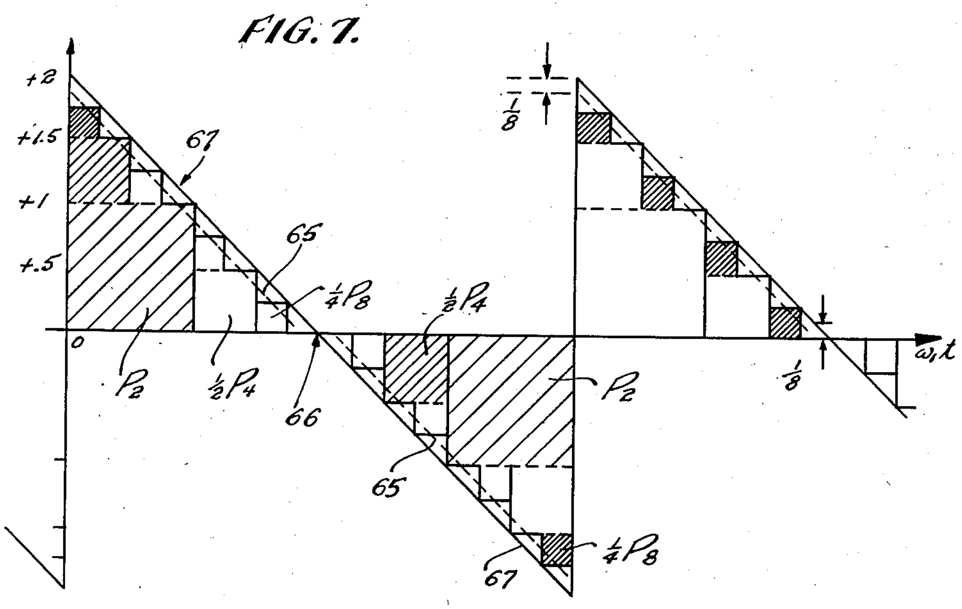
Figure 8:
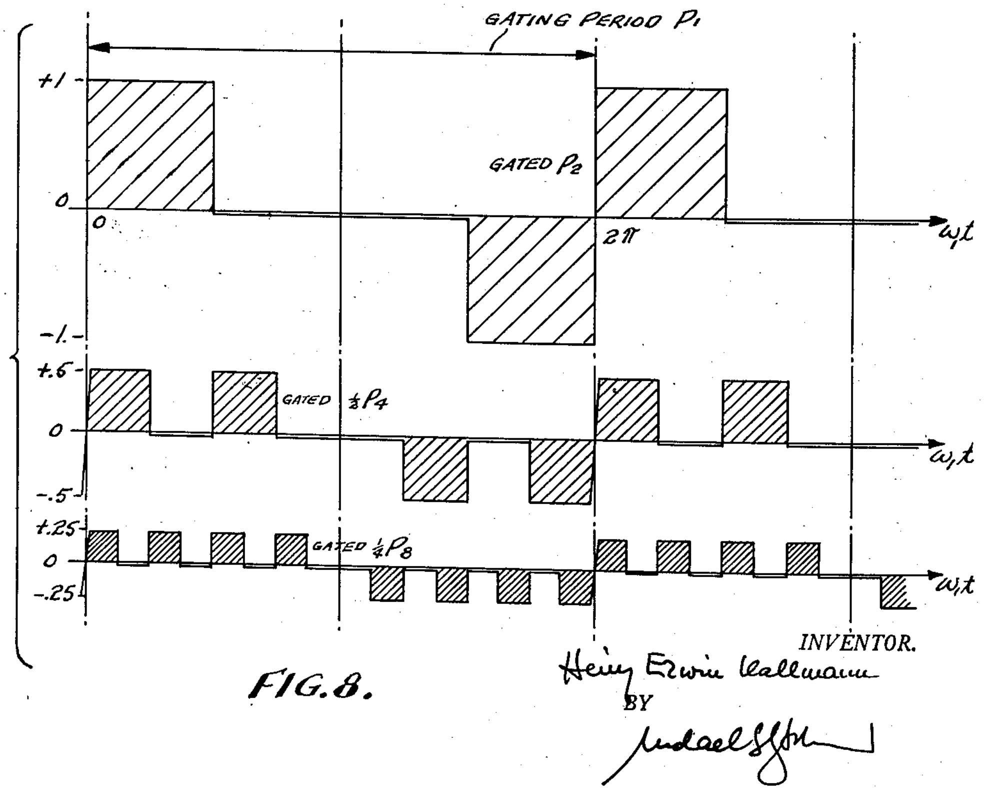
Figure 10:
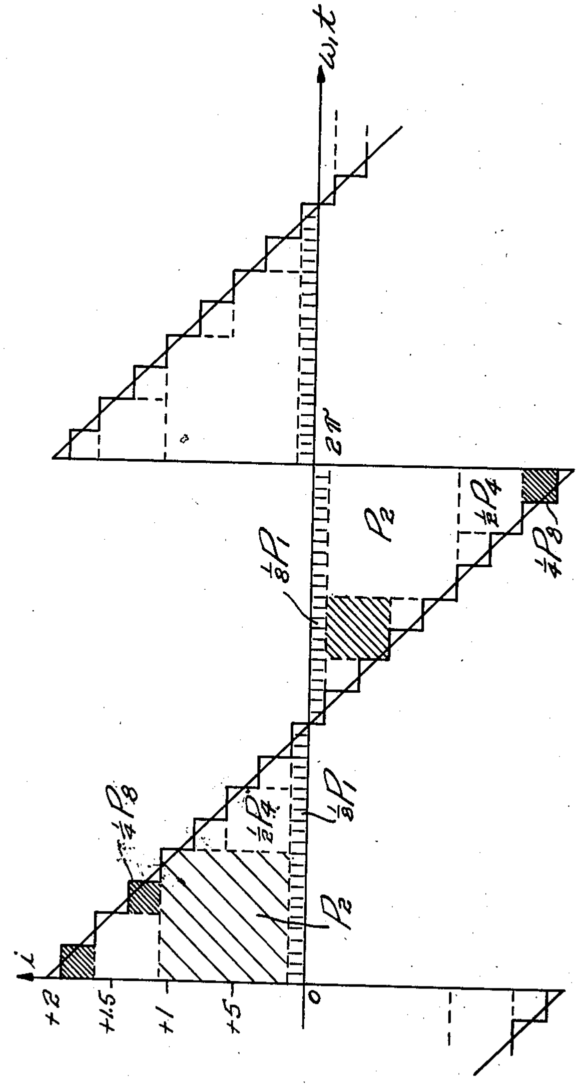
Figure 9:
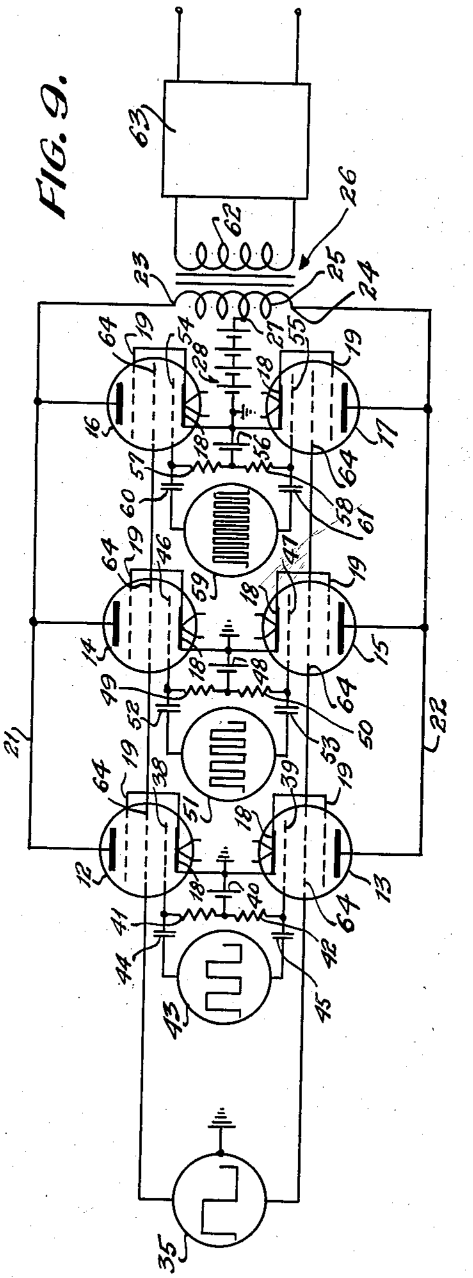
Figure 11:
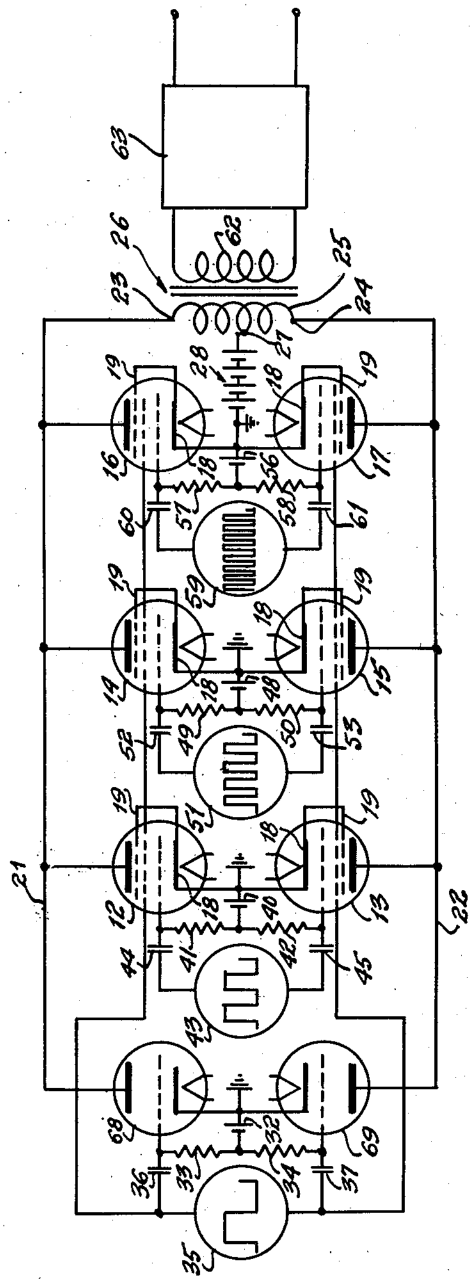

Figs. 3, 4, and 5 are various diagrams for explanation of the attenuation process, described further below in detail;

Fig. 6 shows a circuit of an electric arrangement for synthesizing saw-tooth currents from square wave currents in the manner shown in Figs. 1 and 2;

Fig. 7 is a diagrammatic showing of a synthesis of saw-tooth waves from consecutive groups of square pulses having alternating polarity;

Fig. 8 is a diagrammatic explanation of the saw-tooth wave synthesis shown in Fig. 7;

Fig. 9 shows a circuit of an electric arrangement for synthesizing saw-tooth currents from square wave pulses in the manner shown in Figs. 7 and 8;

Fig. 10 is a diagrammatic showing of a synthesis of saw-tooth waves from consecutive groups of square pulses having alternating polarity, similar to the synthesis shown in Fig. 7, but slightly modified so as to yield a straight saw-tooth slant of the resultant current upon attenuation; and Fig. 11 shows a circuit of an electric arrangement for synthesizing saw-tooth currents from square wave pulses in the manner shown in Fig. 10.

Before describing in detail various specific methods of producing saw-tooth currents in accordance with my present invention, I wish to give the following general explanations:

Generators for sufficiently perfect square wave currents can be made simply and very efficiently by switching on and off of amplifier tubes, gas filled triodes, or even mechanical relays. Since in square wave generators the transition time from off to on, and vice versa, is negligible, tubes can be used with very high efficiency without fear of nonlinear distortion and they can handle considerable power since the anodes are at very low potential $E_{p1}$ when the current $i_p$ is on, and at high potential $E_{p2}$ only when the current is off; the anodes are thus alternatingly subject to no load, or the very slight load $W=i_pE_{p1}$.

As is well known, a square wave, hereafter denoted by $P_r$, with the index $r$ denoting its frequency, comprises all odd harmonics of the basic sine wave $\sin\omega_1$. Thus, for example, the square wave $P_1$ is represented by $$P_1=\sin\omega_1+\tfrac{1}{3}\sin\omega_3+\tfrac{1}{5}\sin\omega_5+\tfrac{1}{7}\sin\omega_7+\ldots+\frac{1}{n}\sin\omega_n$$

for $n$ odd. Thus, a single square wave $P_1$ contains already all the odd members of the saw-tooth wave $S_1$ and with the proper amplitudes and phases. Therefore, to synthesize a saw-tooth wave $S_1$, it is only necessary to add a number of square waves $P_2$; $P_4$; $P_8$ . . . whose next lowest member $P_2$ has twice the frequency of $P_1$ and one half its amplitude, and so on, the frequency of the square waves rising with $2^n$ and their amplitudes falling with $\frac{1}{2}^n$, as is obvious from Figures 1 and 2 and the following tabulation:

$$1\,P_1=\sin\omega_1+\tfrac{1}{3}\sin\omega_3+\tfrac{1}{5}\sin\omega_5+\tfrac{1}{7}\sin\omega_7+\tfrac{1}{9}\sin\omega_9+\tfrac{1}{11}\sin\omega_{11}+\tfrac{1}{13}\sin\omega_{13}+\tfrac{1}{15}\sin\omega_{15}\quad\tfrac{1}{17}\sin\omega_{17}$$

$$+\tfrac{1}{2}P_2\quad \tfrac{1}{2}\sin\omega_2\quad \tfrac{1}{6}\sin\omega_6\quad \tfrac{1}{10}\sin\omega_{10}\quad \tfrac{1}{14}\sin\omega_{14}$$

$$+\tfrac{1}{4}P_4\quad \tfrac{1}{4}\sin\omega_4\quad \tfrac{1}{12}\sin\omega_{12}$$

$$+\tfrac{1}{8}P_8\quad \tfrac{1}{8}\sin\omega_8\quad 0$$

$$S=\sin\omega_1+\tfrac{1}{2}\sin\omega_2+\tfrac{1}{3}\sin\omega_3+\tfrac{1}{4}\sin\omega_4+\tfrac{1}{5}\sin\omega_5+\tfrac{1}{6}\sin\omega_6+\tfrac{1}{7}\sin 7+\tfrac{1}{8}\sin\omega_8+\tfrac{1}{9}\sin\omega_9+\tfrac{1}{10}\sin\omega_{10}+\tfrac{1}{11}\sin\omega_{11}+\tfrac{1}{12}\sin\omega_{12}+\tfrac{1}{13}\sin\omega_{13}+\tfrac{1}{14}\sin\omega_{14}+\tfrac{1}{15}\sin+\ldots$$

Thus, from $n$ square waves, a saw-tooth wave can be synthesized exactly up to the $(2^n-1)$th harmonic, e. g. to the 15th harmonic with 4 square waves.

Figure 1 shows the consecutive steps of approximating an ideal saw-tooth wave $S_1$ by adding to a square wave $P_1$ another square wave $\frac{1}{2}P_2$; then a third square wave $\frac{1}{4}P_4$; and finally a fourth square wave $\frac{1}{8}P_8$. Figure 2 shows these four square waves separately, with their proper amplitudes and relative phases.

Figure 1 confirms that indeed the 16th harmonic is the lowest one missing, and of peak amplitude $(\frac{1}{16})P_1$. Since the peak-to-peak amplitude of the ideal saw-tooth curve is $$2(1+.5+.25+.125+\ .\ .\ .\ )=4,$$

the steps due to the missing 16th harmonic are in this case $\frac{1}{16}=6.25\%$ of the peak-to-peak amplitude, their maximum deviation from the ideal being $\pm 3.12\%$ of the peak-to-peak ideal saw-tooth amplitude.

If a close approximation to the ideal saw-tooth shape—that is, with negligible rise time between sharp points—is desired, the 16-step curve may be completed to a smooth saw-tooth curve by adding a saw-tooth $\frac{1}{16}S_{16}$; that is of a frequency $\omega_{16}$ and with a peak-to-peak amplitude of 6.25% of the peak-to-peak saw-tooth amplitude. Since such saw-tooth current is of relatively slight amplitude and all its components are of relatively high frequency, it can evidently be supplied from a conventional saw-tooth generator of weak power and poor wave form, without perceptible harm to the synthesized saw-tooth curve.

In most cases, however, where high power saw-tooth currents are required, such as for television tube beam deflection, a true saw-tooth curve is not required. The there required scanning current should have a straight slant for, perhaps, 85% of the period, with the remainder of the period allowed for a finite return time and rounded peaks. Such a curve may be obtained from the 16-step curve by proper smoothing of the 16 steps. As is known from the study of transient responses, a sudden drop in the amplitude response of a system, e. g. at the frequency $\omega_{16}$, will result in a ripple in the corresponding time response, and of the frequency $\omega_{16}$. To avoid such ripple, i. e. the 16 steps in the synthetic saw-tooth approximation, it is necessary to subject all the components to an attenuation that rises steadily with frequency at such a rate that the transmission of the lowest missing harmonic component would be negligible in any case; then its complete absence can, obviously, not be noticed.

I have found that a suitable law of attenuation is amplitude $A=e^{-(\omega/\omega_0)2}$, plotted as transmitted amplitude A versus frequency in Figure 3. It is known that the effect of such attenuation upon a unit step transient is to round it to the shape shown at right in Figure 4, corresponding to the error integral ERF:

$$ERF=.5+1/\sqrt{\pi}\int_0^{\omega_0+2}e^{-X2}.dt$$

Correspondingly, I have found that an ideal saw-tooth curve, shown as broken line in Figure 5, is rounded to the curve shown as solid line in that figure. Since the 16-step curve differs from the ideal saw-tooth curve only in those harmonic components above the 15th that are attenuated below perception by the attenuation, it follows that the 16-step curve after undergoing this attenuation of the higher harmonics cannot differ perceptibly from the curve shown as solid line in Figure 5. To this end, the parameter $\omega/\omega_0$ of the attenuation was so chosen that the 8th harmonic is attenuated to $e^{-2}=.368$ of its original value and the 16th harmonic would, if present, be attenuated to $e^{-4}=.018$ of its original value. Since that value is already $\frac{1}{16}$ of the amplitude $P_1$, it follows that the residual ripple can at most be of the order of .0011 of that amplitude, negligible in most applications.

Apart from the smoothing-out of the ripple, the curve in Figure 5 shows that the steep rise of the saw-tooth is perceptibly slowed down and both peaks rounded; but the slanting part of the curve is quite straight for the required 85% of the period. For less exacting requirements, more severe attenuation of the higher harmonics may be permitted, provided it is gradual according to the curve Figure 3. For even more exacting requirements, such as a straight slant covering over 90% of the period, a fifth square wave, $(\frac{1}{16})P_{16}$, may be added and the attenuation retarded to reach negligible transmission at $\omega_{32}$, the then lowest missing harmonic. It is not necessary to perform this attenuation exactly according to the shape of the curve Figure 3; any fair approximation, as is easily obtained with simple and usual networks, will suffice, as long as care is taken to keep phase distortion low, since that would cause asymmetry of the saw-tooth.

In Figure 6 is shown a generator for generating a saw-tooth current by synthesizing square wave currents as explained above and shown diagrammatically in Figures 1 and 2. As shown in Figure 6, the circuit diagram of this generator comprises four push-pull pairs of amplifier tubes, namely the tubes 10, 11, 12, 13, 14, 15, 16, and 17. All cathodes 18 and suppressor grids 19 of these tubes are at ground potential, the former heated by heater elements of conventional type from a source of heater current, not shown in the drawings.

All anodes of the four tubes, 10, 12, 14, and 16, are connected as indicated by line 21 in parallel and at 23 to one branch of the primary winding 25 of the push-pull output transformer 26; all the anodes of the four tubes 11, 13, 15, and 17, are connected in parallel as indicated by line 22 and at 24 to the other branch of the same primary winding 25.

All screen grids 20 and the center tap 27 of the primary winding 25 are connected to the positive terminal of the battery 28 whose negative terminal is grounded.

The control grids of each pair of push-pull tubes are biased with a negative D. C. potential derived from corresponding batteries, namely the control grids 30 and 31 of the tubes 10 and 11 from battery 32 via the grid resistors 33 and 34, the control grids 38 and 39 of tubes 12 and 13 from battery 40 via the grid resistors 41 and 42, the control grids 46 and 47 of tubes 14 and 15 from battery 48 via the grid resistors 49 and 50, and the control grids 54 and 55 of tubes 16 and 17 from battery 56 via the grid resistors 57 and 58.

The control grids of each pair of push-pull tubes are controlled in push-pull by a square wave signal, namely the grids 30 and 31 by a square wave of the period $P_1$ generated by the square wave generator 35 via the coupling condensers 36 and 37, the control grids 38 and 39 of the push-pull tubes 12 and 13 by a square wave of the period $P_2$ generated by the square wave generator 43 via the coupling condensers 44 and 45, the control grids 46 and 47 of the push-pull tubes 14 and 15 by a square wave of the period $P_4$ generated by the square wave generator 59 via the coupling condensers 60 and 61, and the control grids 54 and 55 of the push-pull tubes 16 and 17 by a square wave of the period $P_8$ generated by the square wave generator 59 via the coupling condensers 60 and 61.

The four square wave generators 35, 43, 51, and 59 are not shown in detail since they may be of any known type. It is, however, important to note that they are synchronized according to the phase relation shown in Figures 1 and 2 by synchronizing means which are not shown in the drawings either since they may also be of any known type. The output consisting of the sum of all the square waves currents produced by the four pairs of push-pull tubes is a 16-step-wave current and is obtained at the secondary winding 62 of the output transformer 26. It is fed from this secondary winding, for smoothing as explained above, to a suitable low-pass filter 63 which is also not shown in detail since it may also be of any known type.

The above described circuit operates as follows: A square wave signal of the frequency $P_1$ generated by the generator 35 alternatingly opens and cuts off the tubes 10 and 11 forming the first pair of push-pull tubes; a synchronous square-wave signal of the frequency $P_2$ generated by the generator 43 similarly controls the tubes 12 and 13 of the second pair of push-pull tubes; a third square-wave signal $P_4$ generated by the generator 51 synchronously controls the tubes 14 and 15 of the third pair of push-pull tubes; and finally, a wave $P_8$ generated by the generator 59—which wave is preferably a square wave but might be of poor quality or even a sine wave—controls the tubes 16 and 17 of the fourth pair of push-pull tubes in the same manner as the square waves $P_1$, $P_2$ and $P_4$ control the corresponding pairs of push-pull tubes.

By means of the screen grid potentials and control grid bias, derived from the grid bias batteries 32, 40, 48, and 56, the tubes 10 to 17 are so adjusted that their anode currents during the conducting periods have relative amplitudes of 1.–; 1.–; 0.5; 0.5; 0.25; 0.25; 0.125; and 0.125, respectively. All these anode currents are fed by the lines 21 and 22 to the common output transformer 26, namely, the currents from the tubes 10, 12, 14, and 16 to one branch of the push-pull primary winding 27 and the currents from the tubes 11, 13, 15, and 17 to the other branch of the same primary winding.

As explained in connection with Figures 3 and 5, the step-wave obtained by the saw-tooth current generator shown in Figure 6 and described above contains somewhat stronger higher harmonics than the desired smooth curve. Thus, the square waves supplied by the tubes 10 to 17 to the output transformer 26 need by no means be perfect and the transformer 26 itself may be so imperfect as to cause noticeable loss of higher harmonics; only slight further smoothing by the subsequent filter 63, e. g. of the resistance-capacitance type, will then be necessary.

However, if a close approximation to a true saw-tooth wave is desired, there should be no attenuation of the higher harmonics either in the transformer 26 or in a filter 63; in this event, an amplifier tube not shown in Figure 6 may be connected with its anode to line 21, its grid controlled by a saw-tooth voltage of the frequency $\omega_{16}$, and adding to the output a saw-tooth current of a peak-to-peak amplitude of 6.25% of the whole peak-to-peak amplitude.

For the purpose of estimating the efficiency of the circuit described above, it may be assumed that the plate impedances of the tubes 10 to 17 when conducting can be made small compared with their load impedances. This is certainly the case with gas filled triodes and with the switch impedance of relays. Then it can be shown that the efficiency, in terms of saw-tooth current output vs. D. C. anode current of all tubes, approaches 50%. The balance of 50% is wasted to the extent as currents from one or more of the tubes 10, 12, 14, and 16 flow simultaneously with currents from one or more of the tubes 11, 13, 15, and 17. These currents, flowing in opposite directions through the primary winding 27 of the output transformer 26, cancel each other in their effect upon the output saw-tooth current, but are added as far as drain on the current source is concerned.

This limitation to efficiency is not a necessary feature of my method of square wave synthesis. Inspection of Figures 1 and 2 shows that for much of the time the output is obtained as the difference of the various square wave components. In order to increase efficiency, I propose that the step-wave output should be synthesized only by addition of square pulses, never by subtraction.

Figure 7 shows how a saw-tooth current may be synthesized under these conditions. The square pulse components of this synthesis are shown separately in Figure 8 and consist of sequences of groups of three different types of square pulses, of alternating polarity.

These pulse sequences may be obtained from the second, third and fourth square waves, shown in Figure 2, by gating them with a square wave $P_1$, i. e. by permitting positive half cycles only during the positive half cycle of $P_1$ and permitting negative half cycles only during the negative half cycle of $P_1$.

Figure 9 shows a suitable circuit for synthesizing saw-tooth currents according to the method defined and described in the preceding paragraph, and shown diagrammatically in Figures 7 and 8. This circuit is similar to the circuit shown in Figure 6, but differs from the same in that the tubes 10 and 11 are omitted and in that the tube pairs 12 and 13, 14 and 15, and 16 and 17 are now gated in push-pull by the square wave signal $P_1$ derived from the square wave generator 35, e. g. by controlling their screen grids 64 in push-pull, as shown in Figure 9.

In this circuit, in order to produce a saw-tooth of the frequency $\omega_1$, the tubes 12, 14 and 16 are gated on alternatingly with the tubes 13, 15, and 17, by the square wave signal $P_1$ of square wave generator 35. No square wave current $P_1$ is fed to the output transformer 25, but the square wave pulses of the currents $P_2$, $P_4$, and $P_8$ are doubled in amplitude compared with the first example, in order to yield again the same output amplitude.

As Figure 7 shows, the amplitudes are thus $P_2$; $P_2$; 0.5 $P_4$; 0.5 $P_4$; 0.25 $P_8$; and 0.25 $P_8$ for the tubes 12, 13; 14, 15; and 16, 17, respectively; but it should be noted that each of these tubes now operates only during one half of the cycle $P_1$. Thus, the total current through these six tubes is the same as in the first case but now the current through the tubes 10 and 11 is saved, amounting to one half of the total. Therefore, in this case, by eliminating all mutually opposing currents, the efficiency of the saw-tooth generator may be made to approach 100% of the current fed all its anodes.

As in the first case, the 16-step curve obtained by the synthesis from the three square waves may be completed to a true saw-tooth curve by addition of a pair of tubes (not shown) in the circuit diagram shown in Figure 9, also gated by the square wave $P_1$ and with their control grids controlled in phase by a saw-tooth of the frequency $\omega_{16}$.

Again as in the first case, the 16-step curve may be smoothed to a smooth scanning current by gradually rising attenuation of the higher harmonics, as explained above. However, close examination of Figure 7 will show that the result of such smoothing would lead to the dotted slanting line 65, somewhat displaced from the ideal saw-tooth, and with a kink at its center 66. The reason therefor is that with the method of pure square wave addition, the corners of the step curve only touch the ideal curve 67 but never protrude beyond it as was the case in Figure 1.

As can be seen in Figure 7, this fault is equivalent to a deficiency in a square wave component $P_1$ with an amplitude equal to one half of that of the highest square wave component present. If thus, in the example given, a square wave $P_1$ with an amplitude ⅛ is added to the output, as shown in Figure 10, then there is still no energy wasted by mutually opposing currents, yet upon smoothing by gradually rising attenuation of the higher harmonics the identical shape of scanning current can be obtained as was shown in Figure 5, but with twice the efficiency, that is approaching 100%.

In Figure 11, a circuit is shown which is similar to the one shown in Figure 9 but modified so as to be adapted to add a square wave $P_1$ with an amplitude of ⅛ for the purposes explained in the preceding paragraph. This circuit differs from the one shown in Figure 9 only by introduction of the additional pair of push-pull tubes 68 and 69; these push-pull tubes supply to the output transformer 26 a square wave of the frequency as square wave $P_1$, but only ⅛ of the amplitude of the pulses $P_2$ delivered by the tubes 12 and 13 so that its amplitude is one half of the amplitude of $P_8$, the shortest square pulses present.

It will be understood that each of the elements described above, or two or more together, may also find a useful application in other processes for producing electric currents differing from the processes described above.

While I have illustrated and described the invention as embodied in processes and circuits for producing saw-tooth currents, I do not intend to be limited to the details shown, since various modifications and changes in polarity or amplitudes may be made without departing in any way from the spirit of my invention.

Without further analysis, the foregoing will so fully reveal the gist of my invention that others can by applying current knowledge, readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. Method of producing an electric current with a cyclic wave form having a periodicity of $n$ per second and having a substantially straight slant for at least part of each cycle, comprising the steps of adding several sequences of equal electrical square current pulses whose duration and amplitude in said sequences decrease as the terms of the series $\frac{1}{2}n$, said addition being carried out in such a manner that a change in polarity in the sequence of the longest equal electrical square current pulses at least approximately coincides in time with the change of polarity in all the other sequences of equal electrical square current pulses; and electrically attenuating all added sequences of equal square current pulses in such a manner that the attenuation rises with frequency so as to yield negligible output at and above twice the frequency of the shortest electrical square current pulses added.

2. Method of producing an electric current with a cyclic wave form having a periodicity of $n$ per second and having a substantially straight slant for at least part of each cycle, comprising the steps of adding several sequences of equal electrical square current pulses whose duration and amplitude in said sequences decrease as the terms of the series $\frac{1}{2}n$; and electrically attenuating all added sequences of equal square current pulses in such a manner that the attenuation rises with frequency so as to yield negligible output at and above twice the frequency of the shortest electrical square current pulses added.

3. Method of producing an electric current with a cyclic wave form having a periodicity of $n$ per second and having a substantially straight slant for at least part of each cycle, comprising the steps of adding several electrical square wave currents whose frequencies increase as the terms of the series $2^n$ and whose amplitudes decrease as the terms of the series $\frac{1}{2}n$, said addition being carried out in such a manner that a change in polarity of the square wave current of lowest frequency at least approximately coincides in time with a change in polarity in all the other square wave currents; and electrically attenuating all added electrical square wave currents in such a manner that the attenuation rises with frequency so as to yield negligible outputs at and above twice the frequency of the electrical square wave current having the highest frequency.

4. Method of producing in an electric current with a cyclic wave form having a periodicity of $n$ per second and a substantially straight slant for at least part of each cycle, the steps of creating several groups of equal electrical square current pulses whose duration and amplitude in said groups decrease as the terms of the series $\frac{1}{2}n$; adding at least during said part of each cycle the thus created groups of equal electrical square current pulses; and electrically attenuating all added electrical square wave currents in such a manner that the attenuation rises with frequency so as to yield negligible outputs at and above twice the frequency of the electrical square wave current having the highest frequency.

5. Method of producing in an electric current with a cyclic wave form having a periodicity of $n$ per second and a substantially straight slant for at least part of each cycle, the steps of creating several groups of equal electrical square current pulses whose duration and amplitude in said groups decrease as the terms of the series $\frac{1}{2}n$; adding at least during said part of each cycle the thus created groups of equal electrical square current pulses in such a manner that a change in polarity in the group of the longest equal electrical square current pulses at least approximately coincides in time with the change of polarity in all the other groups of equal electrical square current pulses; and electrically attenuating all added electrical square wave currents in such a manner that the attenuation rises with frequency so as to yield negligible outputs at and above twice the frequency of the electrical square wave current having the highest frequency.

6. Method of producing in an electric current with a cyclic wave form having a periodicity of $n$ per second and a substantially straight slant for at least part of each cycle, the steps of creating several electrical square wave currents whose frequencies increase as the terms of the series $2^n$ and whose amplitudes decreases as the terms of the series $\frac{1}{2}n$; adding at least during said part of each cycle the thus created electrical square wave currents; and electrically attenuating all added electrical square wave currents in such a manner that the attenuation rises with frequency so as to yield negligible outputs at and above twice the frequency of the electrical square wave current having the highest frequency.

7. Method of producing in an electric current with a cyclic wave form having a periodicity of $n$ per second and a substantially straight slant for at least part of each cycle, the steps of creating several electrical square wave currents whose frequencies increase as the terms of the series $2^n$ and whose amplitudes decrease as the terms of the series $\frac{1}{2}n$; adding at least during said part of each cycle the thus created electrical square wave currents in such a manner that a change in polarity of the square wave current of lowest frequency at least approximately coincides in time with a change in polarity in all the other square wave currents; and electrically attenuating all added electrical square wave currents in such a manner that the attenuation rises with frequency so as to yield negligible outputs at and above twice the frequency of the electrical square wave current having the highest frequency.

8. Method of producing in an electric current with a cyclic wave form having a periodicity of $n$ per second and a substantially straight slant for at least part of each cycle, the steps of creating several groups of equal electrical square current pulses occurring in each of said groups at spacings equal to their durations and having in all said groups the same polarity, the durations, spacings and amplitudes of said equal electrical square current pulses in said groups decreasing as the terms of the series of $\frac{1}{2}n$; adding at least during said part of each cycle the thus created groups of equal electrical square current pulses; and electrically attenuating all added electrical square wave currents in such a manner that the attenuation rises with frequency so as to yield negligible outputs at and above twice the frequency of the electrical square wave current having the highest frequency.

9. Method of producing in an electric current with a cyclic wave form having a periodicity of $n$ per second and a substantially straight slant for at least part of each cycle, the steps of creating several groups of equal electrical square current pulses occurring in each of said groups at spacing equal to their durations and having in all said groups the same polarity, the durations, spacings and amplitudes of said equal electrical square current pulses in said groups decreasing as the term of the series of $\frac{1}{2}n$; adding at least during said part of each cycle the thus created groups of equal electrical square current pulses so that a change of polarity in the group of the longest equal electrical square current pulses at least approximately coincides in time with the change of polarity in all the other groups of equal square current pulses; and electrically attentuating all added electrical square wave currents in such a manner that the attenuation rises with frequency so as to yield negligible outputs at and above twice the frequency of the electrical square wave current having the highest frequency.

10. Method of producing an electric current with a cyclic wave form having a periodicity of $n$ per second and having a substantially straight slant for at least part of each cycle, comprising creating several current pulse sequences consisting each of consecutive alternating current pulse groups of alternating polarity and equal duration, each of said current pulse groups composed of equal electrical square current pulses of equal polarity whose duration is equal their spacing and whose duration, spacing and amplitude in said sequences decrease as the term of the series $\frac{1}{2}n$; adding said current pulse sequences so that in all sequences groups of the same polarity coincide in time with each other; and electrically attenuating all added electrical square wave currents in such a manner that the attentuation rises with frequency so as to yield negligible outputs at and above twice the frequency of the electrical square wave current having the highest frequency.

11. Method of producing an electric current with a cyclic wave form having a periodicity of $n$ per second and having a substantially straight slant for at least part of each cycle, comprising creating several current pulse sequences consisting each of consecutive alternating current pulse groups of alternating polarity and equal duration, each of said current pulse groups composed of equal electrical square current pulses of equal polarity whose duration is equal their spacing and whose duration, spacing and amplitude in said sequences decrease as the term of the series $\frac{1}{2}n$; adding said current pulse sequences so that in all sequences groups of the same polarity coincide in time with each other, and the change in polarity in the sequence consisting of consecutive alternating current pulse groups composed of the longest electrical square current pulses coincides in time with a change in polarity in all the other sequences consisting of consecutive alternating current pulse groups composed of electrical square current pulses; and electrically attenuating all added electrical square wave currents in such a manner that the attentuation rises with frequency so as to yield negligible outputs at and above twice the frequency of the electrical square wave current having the highest frequency.

HEINZ ERWIN KALLMANN.

REFERENCES CITED

The following references are of record in the file of this patent:

UNITED STATES PATENTS

| Number | Name | Date |
|---|---|---|
| 2,474,266 | Lyons | June 28, 1949 |
| 2,488,297 | Lacy | Nov. 15, 1949 |

OTHER REFERENCES

A New Photo-Electric Method for Fourier Synthesis and Analysis by Furth and Pringle; The London, Edinburgh and Dublin Philosophical Magazine and Journal of Natural Science; Ser. 7, vol. 35; October 1944, pages 643, 565.

A Machine for the Summation of Fourier Series, by Hagg and Laurent, Journal of Scientific Instruments; vol. 23, July 1946; pages 155–158.